US006019478A

United States Patent [19]

Pizzo

[11] Patent Number: 6,019,478

[45] Date of Patent: Feb. 1, 2000

[54] ILLUMINATED KNOB ASSEMBLY

[75] Inventor: William C. Pizzo, Lisle, Ill.

[73] Assignee: Illinois Tool Works Inc., Glenview, Ill.

[21] Appl. No.: 09/048,770

[22] Filed: Mar. 26, 1998

Related U.S. Application Data

[63] Continuation-in-part of application No. 08/812,576, Mar. 7, 1997, Pat. No. 5,752,759.

[51] Int. Cl.[7] .......... G01D 11/28

[52] U.S. Cl. .......... 362/26; 362/551

[58] Field of Search .......... 362/261, 30, 551, 362/85, 501, 100

[56] References Cited

U.S. PATENT DOCUMENTS

| | | | |
|---|---|---|---|
| 5,171,080 | 12/1992 | Bathurst | 362/26 X |
| 5,335,148 | 8/1994 | Tominaga | 362/26 |
| 5,752,759 | 5/1998 | Pizzo | 362/26 |

*Primary Examiner*—Stephen Husar

*Attorney, Agent, or Firm*—Kane, Dalsimer, Sullivan and Levy, LLP

[57] ABSTRACT

The control knob engages, on its interior, a translucent polycarbonate jewel body collar assembly of a first color, such as white, which, in turn, provides a housing for a translucent polycarbonate jewel light pipe assembly of a second color, such as blue or blue-green. The jewel body collar assembly includes a collar to engage the interior cylindrical support section of the control knob and a light pipe housing assembly to engage the jewel light pipe assembly. The jewel body collar assembly further includes a ridge which protrudes through a slot in the sidewall and front face of the control knob thereby forming an indicator for the control knob. In ambient illumination, such as during the day, the indicator appears to be the color of the jewel body collar assembly, such as white. However, when the dashboard is electrically illuminated, such as during the night, the illumination is collected by the jewel light pipe assembly, and the color of the jewel light pipe assembly, such as blue or blue-green, is projected through the ridge of the jewel body collar assembly and the indicator appears to be blue or blue-green.

14 Claims, 7 Drawing Sheets

ILLUMINATED KNOB ASSEMBLY

This application is a continuation-in-part of application Ser. No. 08/812,576, filed on Mar. 7, 1997, now U.S. Pat. No. 5,752,759.

BACKGROUND OF INVENTION

1. Field of Invention

This invention pertains to a control knob, particularly for automotive applications, with an indicator portion which remains a first preselected color, such as white, during the day, but which appears illuminated at night to a second preselected color, such as blue. Additionally, a collar assembly of the first preselected color within the control knob supports a light pipe assembly of the second preselected color and provides a bearing surface against the mating bezel.

2. Description of the Prior Art

In the prior art, control knobs, particularly control knobs in automotive applications, have had position indicators for indicating the rotational position of the knob. While paints and inks have frequently been used to provide such an indicator, this solution has not been resistant to abrasion. U.S. Pat. No. 5,450,653 entitled "Composite Knob with an Insertable Position Indicator" issued on Sep. 19, 1995 to Howie, Jr. discloses a composite knob with an insertable position indicator which would be more resistant to abrasion than simple paints or inks. The position indicator has a color contrasting to that of the knob. However, this indicator does not provide a first color, such as white, during the daytime, and a second distinct color, such as blue, during the nighttime.

U.S. Pat. No. 5,050,269 entitled "control Knob" issued on Sep. 24, 1991 to Engstrom et al. discloses a control knob, apparently for a portable telephone or "walky-talky" type device with an outer portion of reduced hardness molded over an inner portion with a blade portion extending through the outer portion to provide an indicator. This does not appear to provide for different colors of the indicator during daytime and nighttime.

U.S. Pat. No. 5,518,561 entitled "True Color Day-Night Graphics and Method of Assembly issued on May 21, 1996 to Rosa discloses a display panel with a light-emitting electroluminescent portion, but does not relate to control knobs, particularly for automotive applications.

Additionally, in the prior art, it has been a substantial concern that the knobs not wobble in use, as this may be disconcerting to the user.

Other references of interest include U.S. Pat. No. 5,469,758 issued on Nov. 28, 1995 to Howie, Jr.; U.S. Pat. No. 5,259,267 issued on Nov. 9, 1993 to Jurewicz; U.S. Pat. No. 5,303,612 issued on Apr. 19, 1994 to Odom et al. ; U.S. Pat. No. 2,753,911 issued on Jul. 10, 1956 to Haslett; and U.S. Pat. No. 273,685 issued on Mar. 6, 1883 to Huntley.

Additionally, U.S. patent application Ser. No. 08/746,989 entitled "Control Knob" was filed on Nov. 19, 1996 on behalf of the present assignee.

OBJECTS AND SUMMARY OF THE INVENTION

It is therefore an object of this invention to provide a reliable indicator for a control knob, particularly for automotive applications.

It is therefore a further object of this invention to provide an indicator for a control knob, the indicator being a first color, such as white, during the day, and a second color, such as blue, during the night when illuminated.

It is therefore a further object of this invention to provide an indicator for a control knob, particularly for automotive applications, which is simple and inexpensive to construct and install.

It is therefore a further object of this invention to provide a control knob, particularly for automotive applications, with reduced side-to-side wobble.

These and other objects are attained by a control knob which includes a jewel body collar assembly into which a jewel light pipe assembly is inserted. The jewel body collar assembly includes a portion which extends or protrudes through a slot in the cylindrical sidewalls of the control and in a portion of the front of the control knob to form the indicator. Additionally, the jewel body collar assembly includes a cylindrical collar which engages the interior cylindrical portion of the knob which engages the carrier shaft thereby forming a bearing surface against the mating bezel thereby reducing side-to-side wobble of the knob during use. As the jewel body collar assembly is made of a lubricated material, such as acetel, this provides lubrication for the rotation of the control knob. Snap fit engagements provide for ease of assembly. The jewel body collar assembly is translucent, typically white, so that the indicator appears white during daytime. However, the jewel light pipe assembly is translucent and of a second color, such as blue or "ice blue", so that when the knob is illuminated from behind, such as the nighttime, when the dashboard is electrically illuminated, part of this light is transmitted through the jewel light pipe assembly and out the jewel body collar assembly so that the indicator appears as a blue color.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
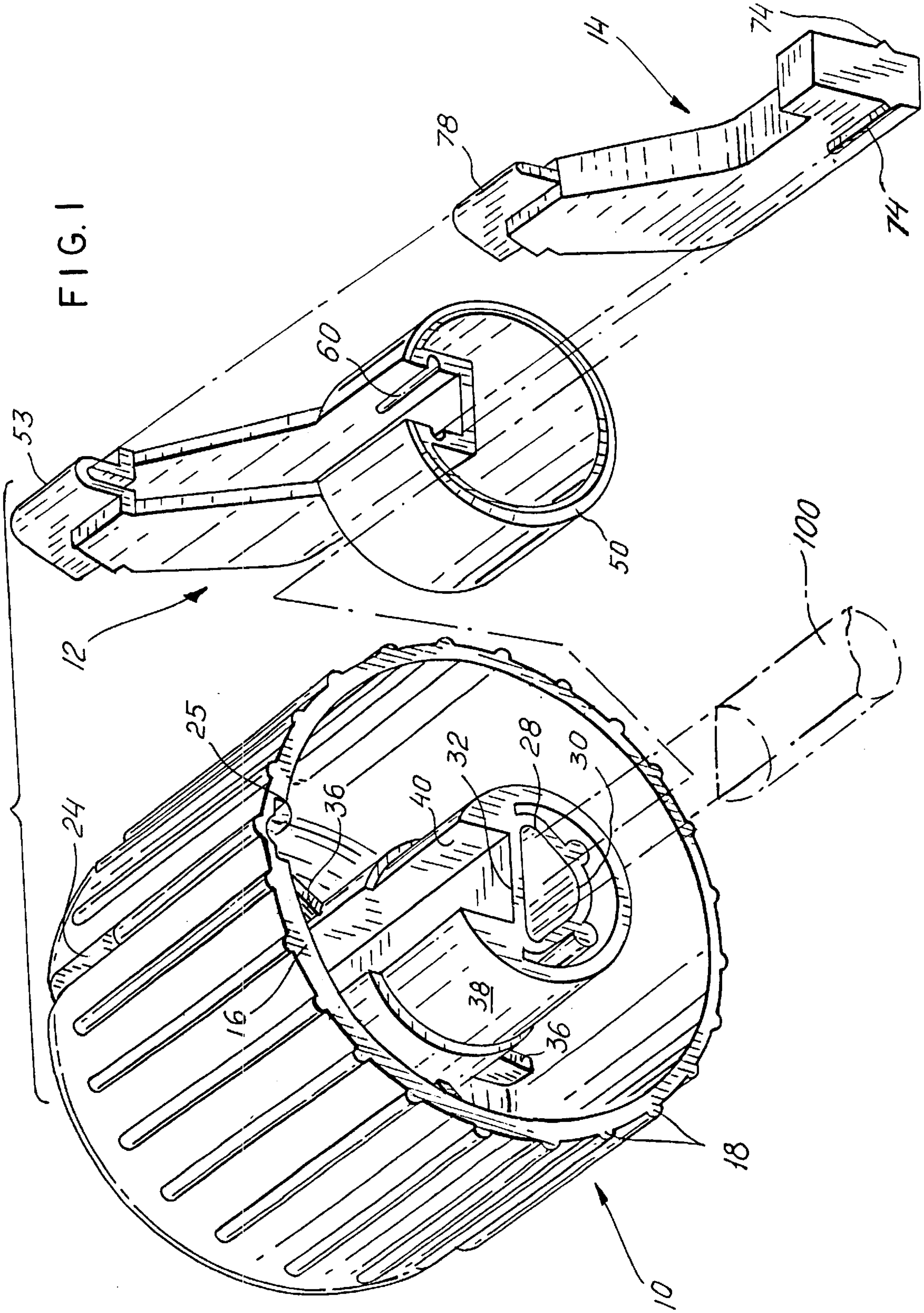
FIG. 1 is an exploded rear view, in perspective, of the control knob, the jewel light pipe assembly and the jewel body collar assembly of the present invention.
Figure 2:
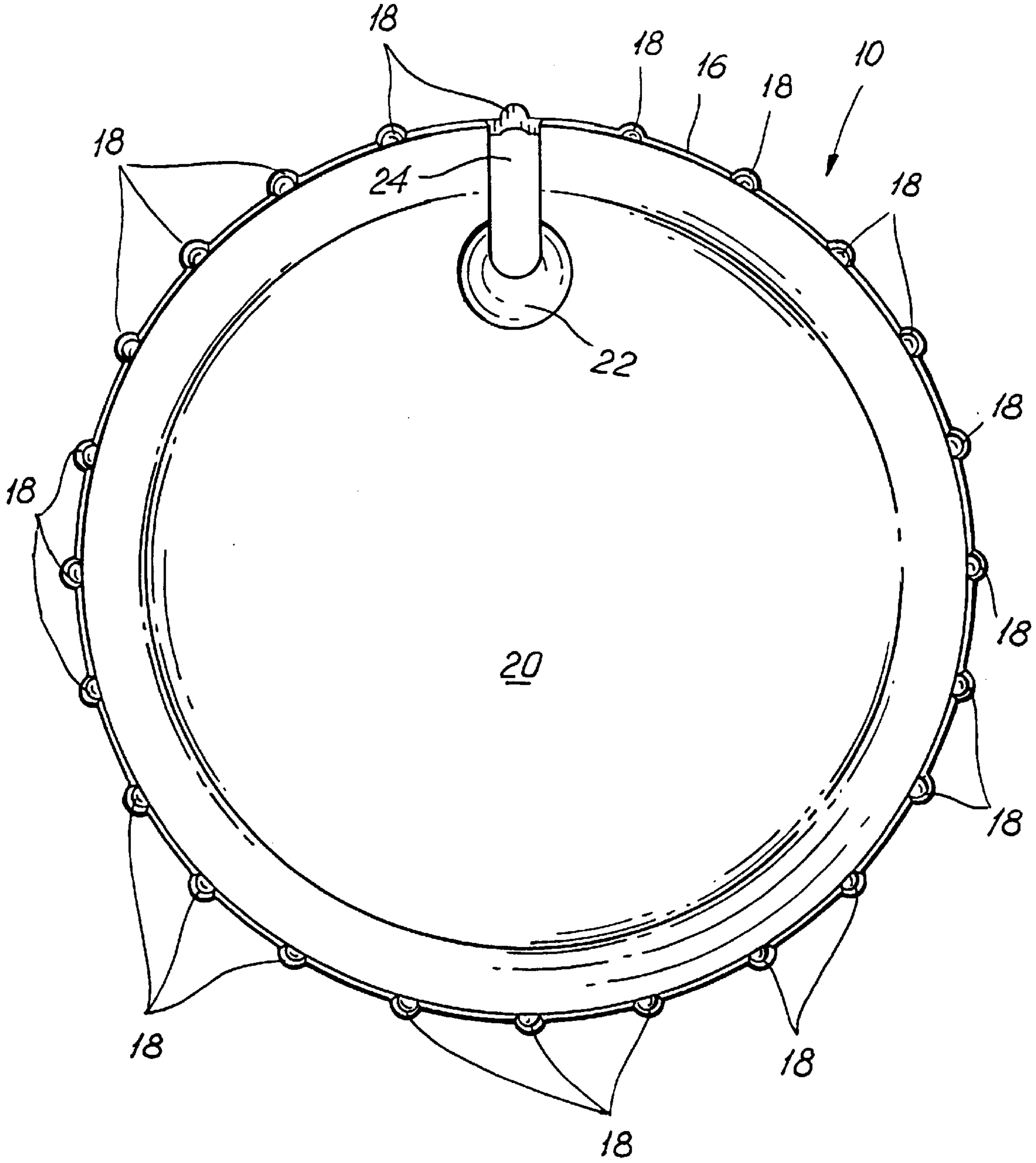
FIG. 2 is a front plan view of the control knob of the present invention.

Referring now to the drawings in detail wherein like numerals refer to like elements throughout the several views, one sees that FIG. 1 is an exploded rear view of the control knob 10, jewel light pipe assembly 12 and jewel body collar assembly 14 of the present invention. As shown in FIGS. 1 and 2, the control knob 10 includes a cylindrical shell 16 with undulations 18 spaced about the periphery thereof. Undulations 18 allow the user to grasp firmly and rotate control knob 10.

Figure 5:
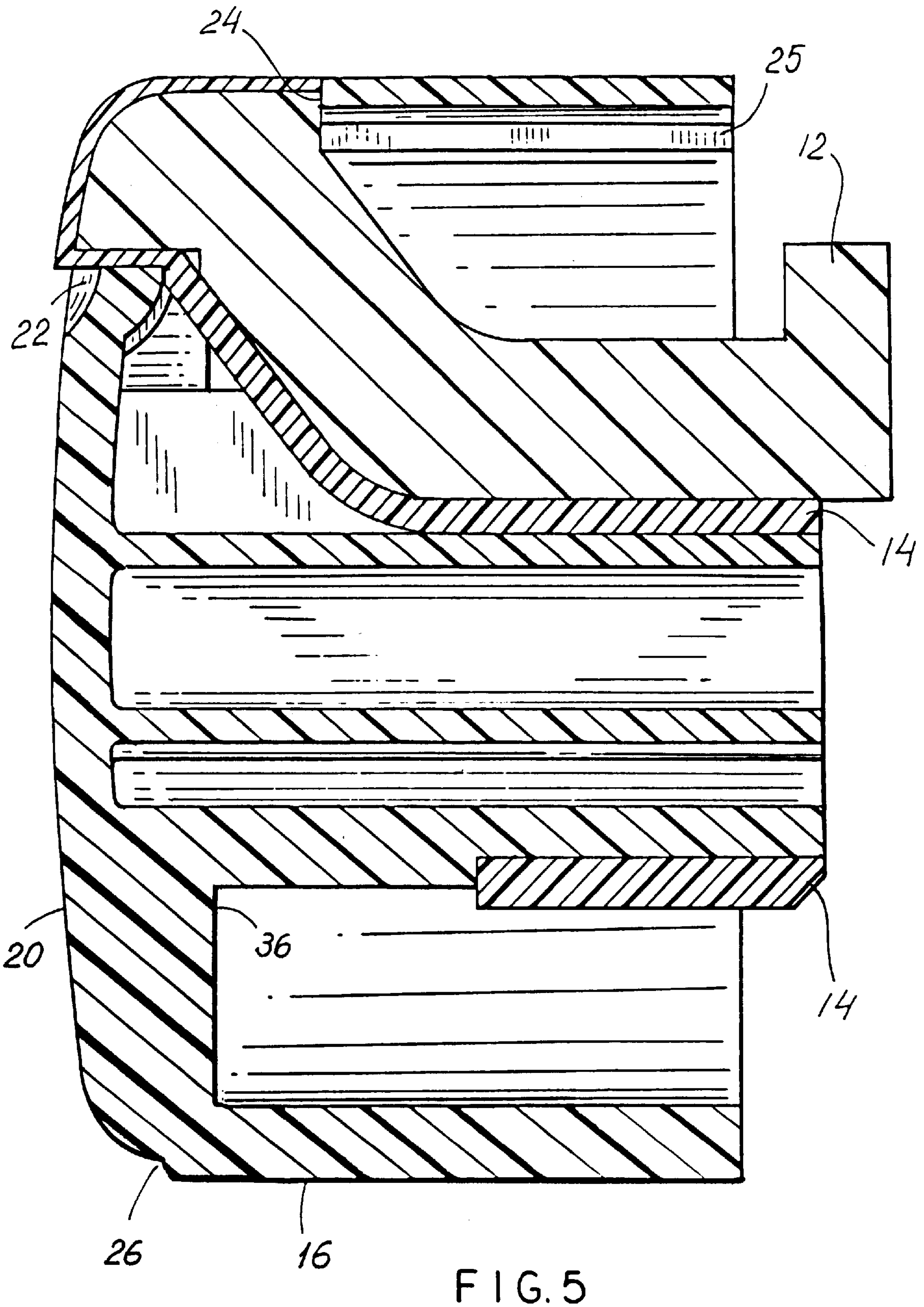
FIG. 5 is a side cross-sectional view of the control knob, assembled with the jewel light pipe assembly and jewel body collar assembly, of the present invention.
Figures 6A, 6B, 6C, 6D, 6E:
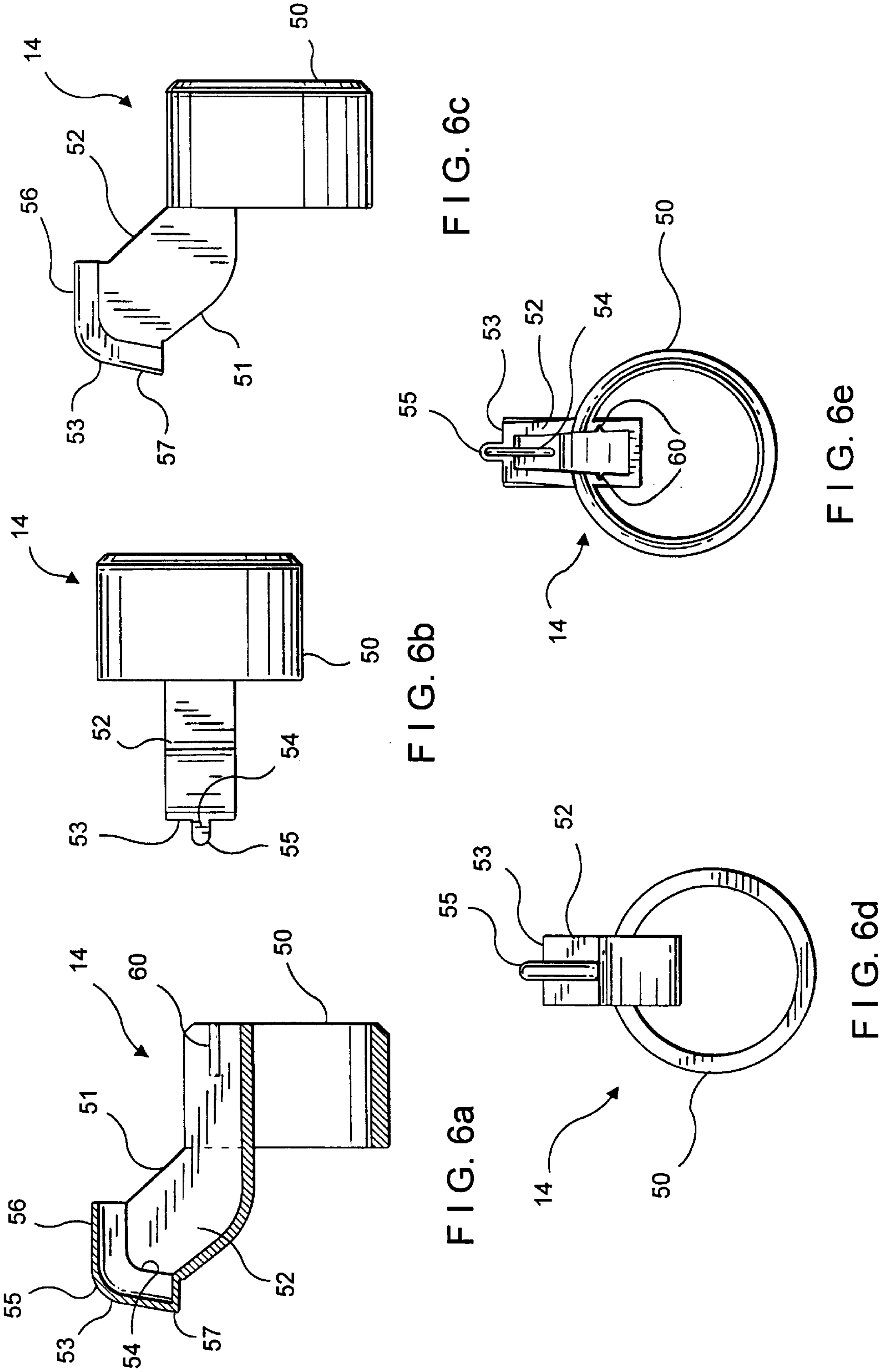
FIG. 6*a*, 6*b*, 6*c*, 6*d* and 6*e* are cross-sectional side, bottom plan, side plan, front plan and rear plan views, respectively, of the jewel body collar assembly of the present invention.

As shown in FIGS. 2 and 5, control knob 10 further includes slightly convex front circular face 20 which includes slot 24 extending radially inwardly from the "twelve-o'clock" position, terminating in an indented spherical dimple 22. As further shown in FIGS. 1 and 2, slot 24 is further formed longitudinally along a portion of cylindrical shell 16 at the "twelve o'clock" position and through a portion in which an undulation 18 would otherwise be formed. The interior portion of cylindrical shell 16 at the "twelve o'clock position" (which includes slot 24) includes notch 25 formed by a reduction in thickness of cylindrical shell 16. Similarly, the interior portion of front circular face 20 at the "twelve o'clock position" (which includes slot 24) includes a reduction of thickness, as will be explained hereinafter, to provide a detent mechanism to engage jewel body collar assembly 14.

The outer circumferential edge of front circular face 20 is chamfered inwardly in order to present an edge 26 which is free of sharp surfaces and to present a clean aesthetic appearance.

Figure 3:
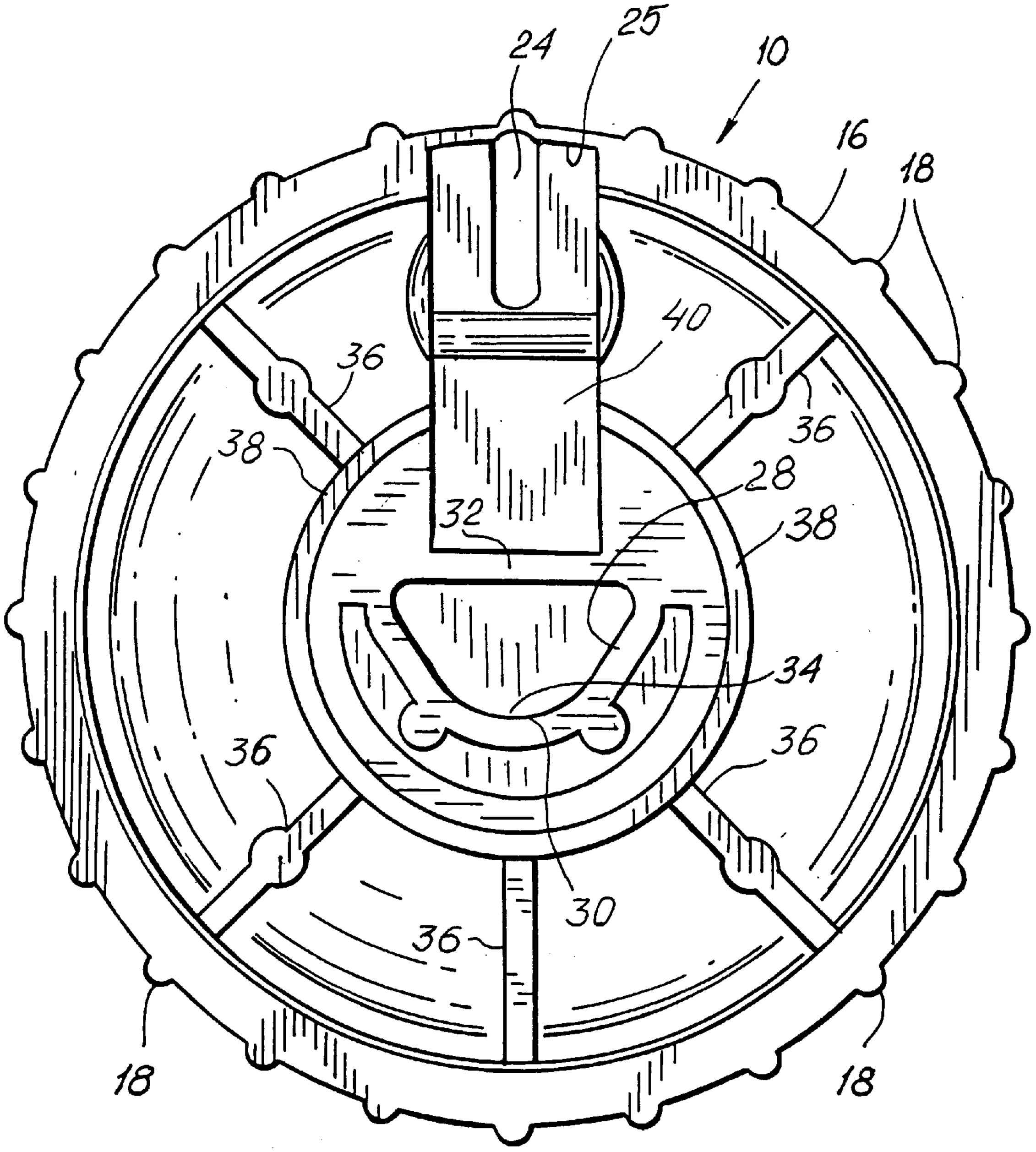
FIG. 3 is a rear plan view of the control knob of the present invention.

As shown in FIGS. 3 and 5, the center of the rear control knob 10 includes a D-shaped aperture 28 comprised of a partially circular portion 30 and a flat portion 32 for engaging a carrier shaft 100 (shown in phantom in FIG. 1) of a similar cross section formed concentrically within cylindrical support portion 38 formed about the axis of rotation of knob 10. FIG. 3 shows the use of to engage control shaft 100. However, the use of could be eliminated with the method of attachment disclosed in pending commonly-assigned U.S. application Ser. No. 08/746,989 entitled "Control Knob" filed on Nov. 19, 1996, now U.S. Pat. No. 5,857,242, the disclosure of which is incorporated herein by reference. Similarly, the disclosure of the parent application, Ser. No. 08/812,576, filed on Mar. 7, 1997, now U.S. Pat. No. 5,752,759 is incorporated herein by reference.

Supporting ribs 36 extend from the interior of cylindrical shell 16 to the exterior of the walls forming D-shaped aperture 28.

Figure 4:
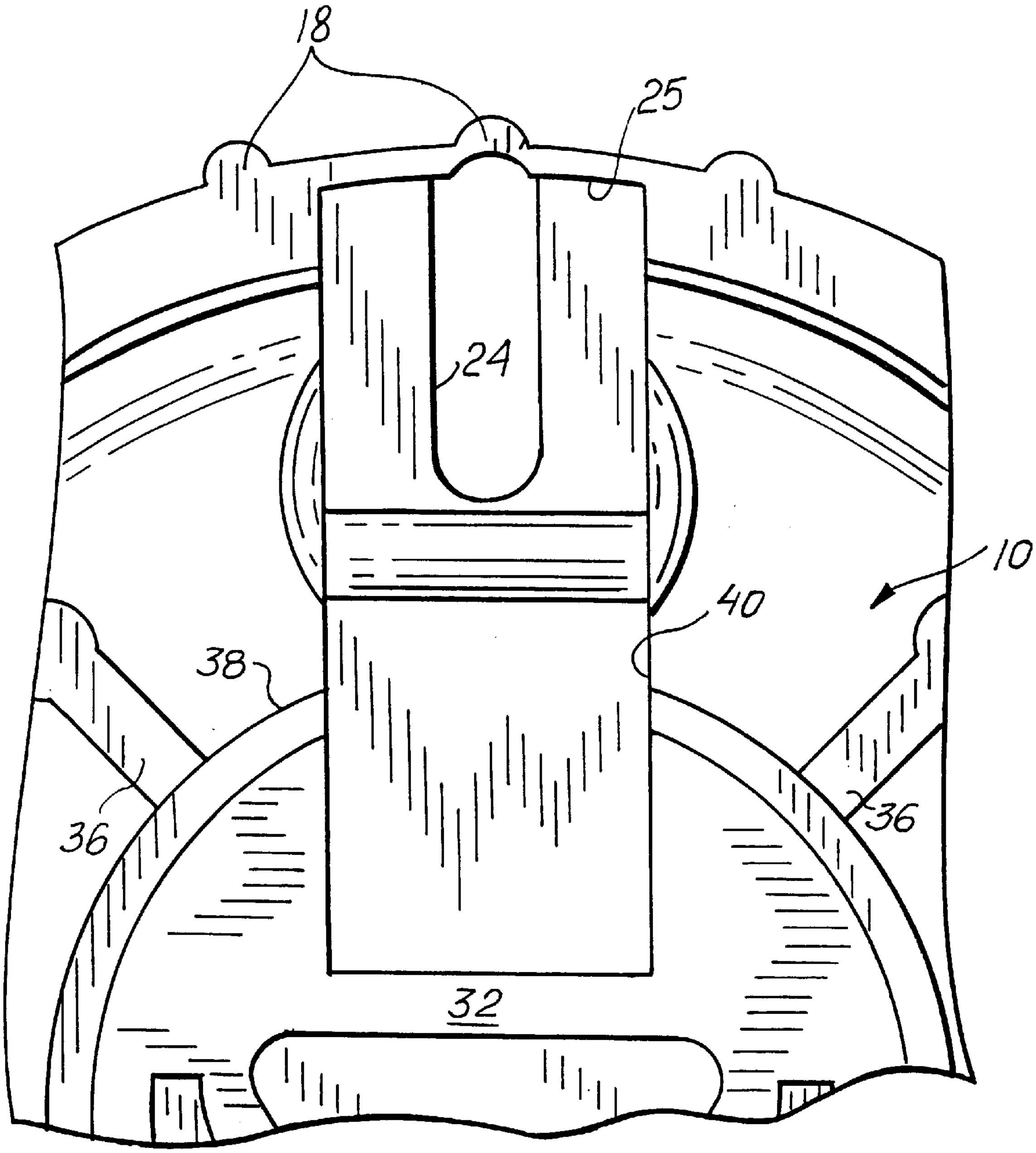
FIG. 4 is a rear view of the channel within the control knob into which the assembled jewel light pipe assembly and jewel body collar assembly fit.

As shown in FIG. 3 and more detail in FIG. 4, notch 40 is formed within cylindrical support portion 38 abutting flat portion 32, radially opposed from notch 25 on the interior of cylindrical shell 16 thereby forming a detent engagement for jewel body collar assembly 14.

While the jewel light pipe assembly 12 and jewel body collar assembly 14 are illustrated as separate elements, these elements could be formed together as one piece in an insert molding process.

Jewel body collar assembly 14 is illustrated in FIGS. 6*a*–6*e*. Jewel body collar assembly 14 includes a cylindrical collar 50 with a light pipe housing assembly 52 fixed along a portion of the circumference thereof. As shown in FIGS. 1 and 3, cylindrical collar 50 joins concentrically around cylindrical support section 38 of knob 10 so as to form a bearing surface against the mating bezel (not shown) thereby reducing or eliminating side-to-side wobble of knob 10 during use. Further, as the jewel body collar assembly 14 is typically made of a lubricated material, such as acetel, ease of rotation of knob 10 is improved.

Light pipe housing assembly 52 further presents angled surface 51 to add relief during assembly until jewel body collar assembly 14 locks into place in control knob 10. This locking or snap fit procedure is described in further detail hereinafter.

The proximal portion of light pipe housing assembly 52 extends inwardly radially from a circumference of cylindrical collar 50 to be engaged by notch 40 of cylindrical support portion 38 of knob 10, as shown in FIGS. 1, 3 and 4 while the distal portion of light pipe housing assembly 52 extends generally diagonally upwardly and outwardly to indicator element 53. Indicator element 53 includes interior grooved section 54 and exterior ridged section 55, further including horizontal section 56 and vertical section 57 (from the perspective of FIGS. 6*a* and 6*c*), both of which are intended to be visible from the exterior of knob 10. Horizontal section 56 of exterior ridged section 55 of indicator element 53 engages the portion of slot 24 on cylindrical shell 16 while vertical section 57 of exterior ridged section 55 of indicator element 53 engages the portion of slot 24 on front circular face 20 (see FIGS. 1 and 2).

Additionally, the proximal portion of light pipe housing assembly 52 includes blind longitudinal slots 60 for engaging jewel light pipe assembly 12.

Jewel body collar assembly 14 is typically polycarbonate, such as acetel, translucent, and of a first preselected color, typically white. Therefore, when jewel light pipe assembly 12 is not illuminated from the dashboard or control panel (not shown), the jewel body collar assembly 14 appears to be white. However, when jewel light pipe assembly 12 is illuminated from the dashboard or control panel, the color of the jewel light pipe assembly 12 (the second preselected color, such as blue, blue-green, or "ice blue") is projected through the jewel body collar assembly 14 and the color of the jewel light pipe assembly 12 on the jewel body collar assembly 14.

Figure 7C:
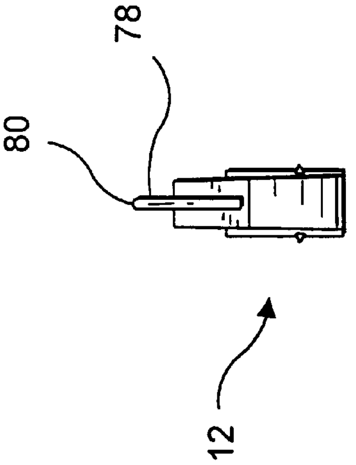
FIGS. 7*a*, 7*b*, 7*c* and 7*d* are side, top, front and detailed side plan views, respectively, of the jewel light pipe assembly of the present invention.
Figure 7D:
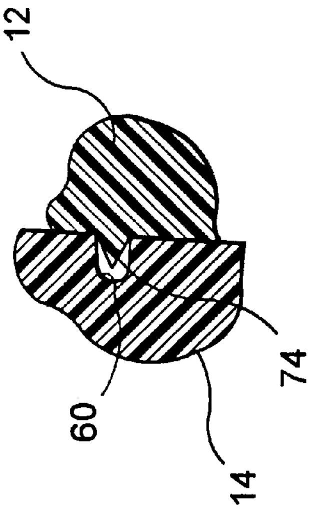
Figure 7A:
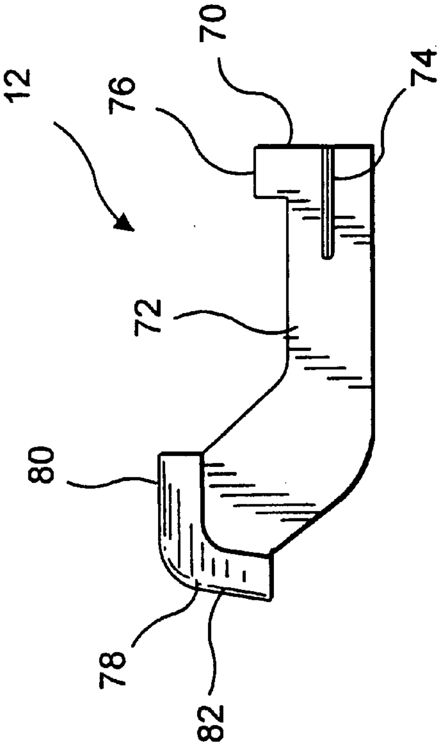
Figure 7B:
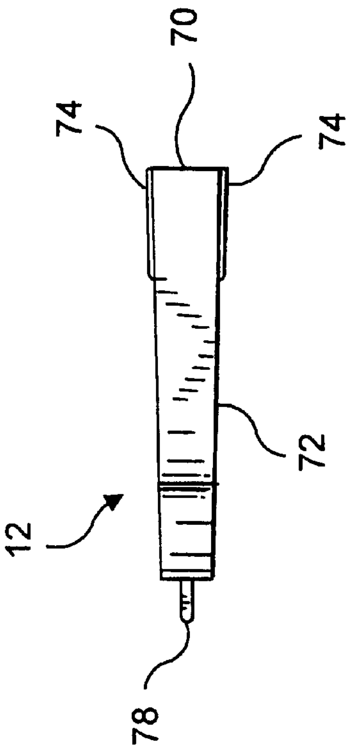

Jewel light pipe assembly 12 is shown in more detail in FIGS. 7*a*, 7*b*, 7*c* and 7*d*. Jewel light pipe assembly 12 includes tail 70 which gathers light from the illuminated dashboard (not shown) or similar control board from which the control shaft 100 extends. The light is directed upwardly from tail 70 into body 72 of jewel light pipe assembly 12. Tail 70 includes longitudinal protrusions 74 (a cross section of which is shown in FIG. 7*d*) which engage blind longitudinal slots 60 in jewel body collar assembly 14. Tail 70 further includes upwardly extending catch 76 to allow the simple manual removal of jewel light pipe assembly 12 from jewel body collar assembly 14. Jewel light pipe assembly 12 is translucent polycarbonate and is of a second preselected color, such as blue, blue-green or "ice blue", which is to be the color of the indicator of control knob 10 during nighttime when the illumination is from the dashboard (not shown) or similar control board. The upper portion of body 72 includes indicator ridge 78 which includes horizontal ridge 80 and vertical ridge 82 (from the perspective of FIG. 7*a*). Horizontal ridge 80 of jewel light pipe assembly 12 engages horizontal section 56 of interior grooved section 54 of jewel body collar assembly 14. Likewise, vertical ridge 82 of jewel light pipe assembly 12 engages vertical section 57 of interior grooved section 54 of jewel body collar assembly 14 (see FIG. 1).

To install the control knob 10, jewel light pipe assembly 12 and jewel body collar assembly 14 of the present invention, the user inserts jewel light pipe assembly 12 into jewel body collar assembly so that longitudinal protrusions 74 of jewel light pipe assembly 12 engage blind longitudinal slots 60 in jewel body collar assembly 14 and further so that horizontal ridge 80 of jewel light pipe assembly 12 engages horizontal section 56 of interior grooved section 54 of jewel body collar assembly 14 and vertical ridge 82 of jewel light pipe assembly engages vertical section 57 of interior grooved section 54 of jewel body collar assembly 14. The user then inserts the jewel light pipe assembly 12 and jewel body collar assembly 14 so that cylindrical collar 50 of jewel body collar assembly 14 outwardly concentrically engages support section 38 of knob 10 so as to form a bearing surface against the mating bezel (not shown). Additionally, proximal portion of light pipe housing assembly 52 which extends inwardly radially from a circumference of cylindrical collar 50 is engaged by notch 40 of cylindrical support portion 38 of knob 10. Horizontal section 56 of exterior ridged section 55 of indicator element 53 of jewel body collar assembly 14 engages the portion of slot 24 on cylindrical shell 16 while vertical section 57 of exterior ridged section 55 of indicator element 53 of jewel body collar assembly 14 engages the portion of slot 24 on front circular face 20. Distal portion of light pipe housing assembly 52 of jewel body collar assembly 14 engages notch 25 of cylindrical shell 16 and likewise engages a similar reduction of thickness on the interior of front circular face 20. These engagements provide for a snap-fit ease of assembly.

The order of assembly of the above elements can be varied.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A control knob comprising:

a support element formed about an axis of rotation of the control knob;

a front face bounded by a cylindrical sidewall and supported by said support element;

a slot in at least one of said cylindrical sidewall and said front face;

a collar assembly including a collar extending around said support element, further including a housing assembly and a ridge extending through said slot, at least said ridge being of a first preselected color; and a light pipe assembly of a second preselected color engaged within said housing assembly.

2. The control knob of claim 1 wherein said light pipe assembly and at least a portion of said collar assembly are translucent.

3. The control knob of claim 2 wherein said first preselected color is substantially white and said second preselected color includes a substantial blue component.

4. The control knob of claim 3 wherein said light pipe assembly gathers illumination from an interior of the control knob and directs the illumination through said ridge of said collar assembly and through said slot, thereby, upon sufficient illumination, causing said ridge to appear to be of said second preselected color.

5. The control knob of claim 4 wherein said collar of said collar assembly is cylindrical and wherein a proximal portion of said housing assembly extends radially inwardly from said collar assembly to engage a notch in said support element.

6. The control knob of claim 5 wherein said housing assembly further includes a distal portion with an interior slot for engaging an indicator ridge of said light pipe assembly.

7. The control knob of claim 6 wherein said interior slot formed immediately underneath said ridge of said collar assembly.

8. The control knob of claim 7 wherein said collar assembly includes longitudinal detent elements for engaging complementary elements of said light pipe assembly.

9. The control knob of claim 8 wherein said collar and said central support element form a bearing surface.

10. The control knob of claim 9 wherein at least said collar is formed of lubricated material.

11. The control knob of claim 10 wherein said lubricated material is acetel.

12. The control knob of claim 11 wherein an interior of said cylindrical sidewall includes an area of reduced thickness proximate to said slot to engage said collar assembly.

13. The control knob of claim 12 wherein an interior of said front face includes an area of reduced thickness proximate to said slot to engage said collar assembly.

14. The control knob of claim 13 wherein said housing assembly includes an angled surface.

* * * * *